May 23, 1967

C. NUSS 3,320,968

FLOW CONTROL DEVICE

Filed May 4, 1964

INVENTOR.

Christopher Nuss.

BY

Harness & Harris

ATTORNEYS.

United States Patent Office 3,320,968
Patented May 23, 1967

3,320,968
FLOW CONTROL DEVICE
Christopher Nuss, Roseville, Mich., assignor to Chrysler Corporation, Highland Park, Mich., a corporation of Delaware
Filed May 4, 1964, Ser. No. 364,458
11 Claims. (Cl. 137—117)

This invention relates to improvements in a fluid flow control device particularly adapted for use in metering the rate of flow of pressurized fluid to a hydraulically actuated power steering gear for an automobile.

It is customary to supply pressurized fluid to an automobile power steering gear by means of a pump driven by the automobile engine, such that the pump is operated at maximum speeds and is capable of delivering its maximum power when the automobile is cruising at high speed along the highways. The power steering gear on the other hand is ordinarily under maximum load and requires maximum power from the pump when the automobile is operating at low speeds, as for example, during a parking maneuver.

In order to minimize heating of the pressurized fluid, it has been customary to strive for a "drooper" effect in the rate of flow of the fluid to the steering gear, such that as the vehicle engine speed increases, the rate of flow of pressurized fluid decreases. This effect is only partially satisfactory because the minimum steering power is not always required at high vehicle speeds, as is evident during a front tire blow-out or when one front wheel suddenly runs onto a soft shoulder of the road. The actual relationship between steering power and vehicle operation requires steering power proportional to steering load, regardless of engine speed.

It is accordingly an object of the present invention to provide an improved flow control device suitable for use with an automobile steering gear, which supplies pressurized fluid to the gear at an increasing pressure and rate of flow as the steering load increases, and at decreasing pressure and rate of flow as the engine speed increases.

Inasmuch as the hydraulic power to the steering gear is proportional to the product of the fluid pressure and the rate of fluid flow, by increasing the rate of flow as the pressure increases, the necessary steering power can be supplied at a lower fluid pressure than is otherwise necessary when the rate of fluid flow is maintained substantially constant. Thus the power steering gear can be operated at lower maximum pressures and consequently at cooler temperatures than have been obtainable heretofore, with consequent reduced costs and rates of wear for both the steering gear and pump.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

Figure 1:
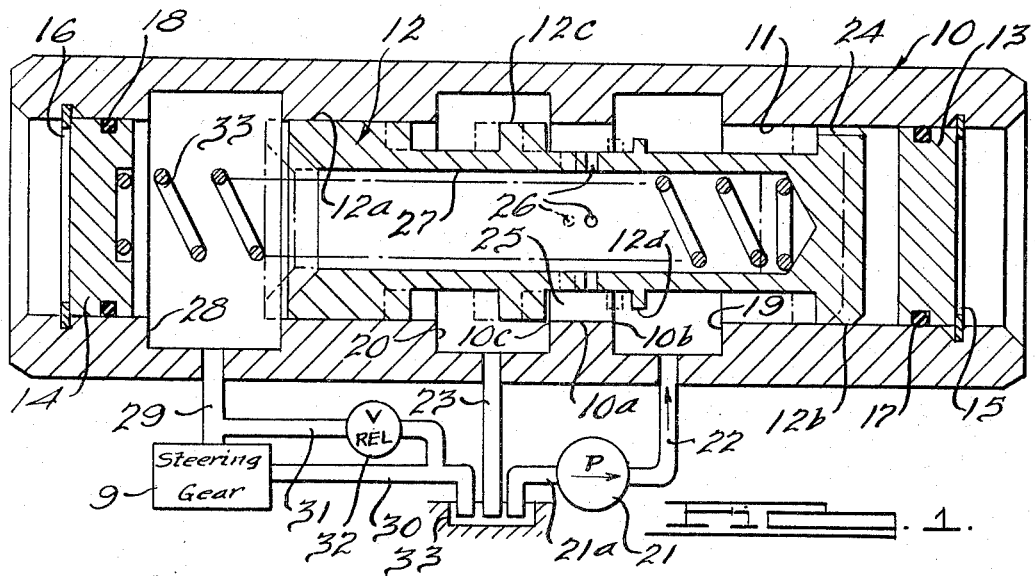
FIGURE 1 is a schematic cross-sectional view taken axially along the mid-region of a flow control device embodying the present invention.
Figure 2:
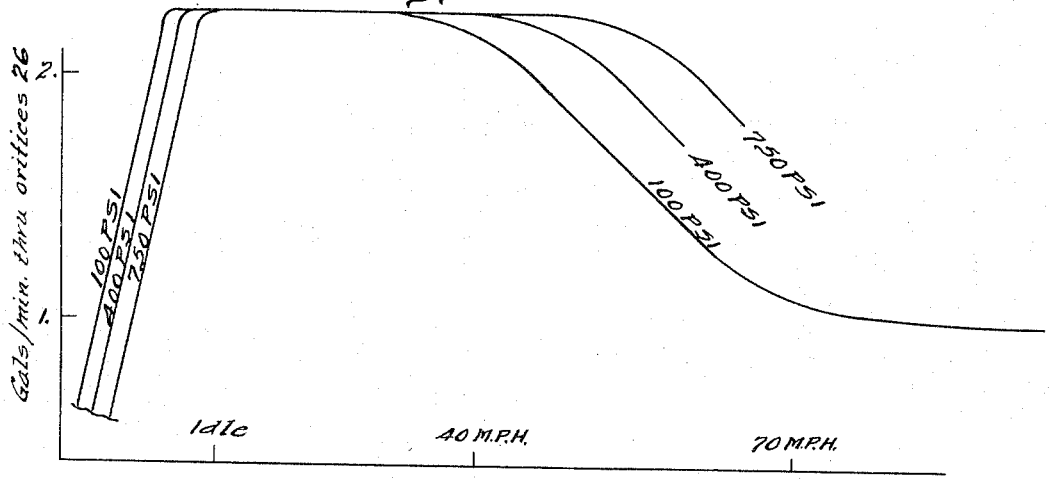
FIGURE 2 is a graphic representation of a family of constant pressure curves at different pump operating pressures showing the fluid flow to the steering gear in gallons per minute on the ordinate and the pump speed in terms of miles per hour engine speed on the abscissa.

Referring to FIGURES 1 and 2, a particular embodiment of the present invention is illustrated by way of example in a flow control device particularly suitable for use in supplying pressurized fluid to an automobile power steering gear 9. The flow control device comprises a tubular valve housing 10 containing a bore or valve chamber 11 of circular right section for an axially slidable spool valve 12 also of circular right section. Opposite ends of the bore 11 are closed by plugs 13 and 14 suitably retained against outward endwise movement by collapsible C-rings 15 and 16 recessed into the housing 10 adjacent the plugs 13 and 14 respectively. Axial leakage around the plugs 13, 14 is prevented by suitable annular seals 17 and 18.

Annular inlet and outlet ports 19 and 20 are provided in the sidewall of housing 10 at axially spaced locations and are in communication respectively with the discharge and inlet sides of a pump 21 by means of conduits 22 and 23 respectively. The pump 21 is driven by the vehicle engine for which the steering gear is provided and may be conventional, such that the speed of operation of the pump 21 and the volume of fluid discharged therefrom through conduit 22 is proportional to the speed of the vehicle engine. An annular portion 10a of the side wall of housing 10 between the ports 19 and 20 terminates at an upstream edge 10b at the inlet port 19 and a downstream edge 10c at the outlet port 20.

The spool valve 12 is provided with enlarged annular guide lands 12a and 12b at its left and right ends respectively in axial sliding engagement with the interior sidewall of the bore 11. The land 12a completes a fluid seal with the inner wall of the bore 11 to prevent axial leakage of high pressure fluid from one side of the valve 12 to the other. The land 12b is provided with a radial groove or passage 24 connecting the inlet 19 with the right end of valve 12, whereby the fluid discharge pressure of pump 21 at inlet 19 is applied to urge valve 12 leftward. An intermediate bypass land 12c is normally in sliding and fluid sealing engagement with the inner housing wall portion 10a to restrict communication between the inlet 19 and outlet 20. In this regard, the external diameter of the valve 12 is reduced between the lands 12c and 12b so as to cooperate with the wall portion 10a to provide an annular bypass conduit 25.

Upon rightward movement of spool valve 12 from the solid line position shown to a closed position, the leading or upstream edge of land 12c engages the wall portion 10a in sealing contact to close the downstream connection between bypass conduit 25 and the outlet 20. Upon leftward or bypass movement of slide valve 12, this latter connection progressively opens to provide a bypass connection between ports 19 and 20. Located upstream of land 12c, and in the region of the port 19 upstream of the edge 10b when the slide valve 12 is in its bypass restricting position illustrated in solid lines, is an annular flow restricting land 12d of the valve 12 adapted to move into the passage 25 in radially spaced relation with respect to the inner wall portion 10a as described more fully below.

Between the lands 12c and 12d are four symmetrically spaced restricted metering orifices 26 extending radially through the sidewall of side valve 12 into an interior bore 27 thereof. The right end of the bore 27 is closed; the left end opens into the left end of bore 11 and a work port 28 thereof connecting bore 27 with the steering gear 9 to supply pressurized operating fluid thereto via conduit 29. The low pressure return or discharge fluid from the steering gear 9 is conducted via return line 30 to the inlet side of pump 21, preferably by means of a reservoir 33 into which conduits 23 and 30 discharge.

In order to prevent excessive fluid pressure on the gear 9, a pressure relief conduit 31 containing a pressure relief or safety valve 32 connects conduits 29 and 30 so as to bypass the gear 9. In the event the unusual operating conditions tending to develop a pressure in conduit 29 in excess of a predetermined value that might damage the gear 9, the pressure relief valve 32 opens to discharge fluid from conduit 29 into conduit 30 to prevent such excessive pressure. Resisting leftward movement of valve 12 is a reaction spring 33 disposed between plug 14 and the right end of valve bore 27 to urge valve 12 rightward to its closed position.

In operation of the circuit described, it is apparent that in general, as the pump discharge pressure increases, the valve 12 will shift to the left in a bypass direction against the reaction force of spring 33 and the pressure in bore 27. The latter pressure increases as the load on or pressure drop across the steering gear 9 increases during a steering operation. Ordinarily in a parking maneuver, the load on gear 9 will be high and the reaction pressure in conduit 29 and bore 27 will be high, tending to urge valve 12 to the right. During normal straight ahead steering, the reaction pressure in bore 27 will be low.

Inasmuch as the effective cross sectional areas of valve 12 exposed to pressure at its opposite ends are equal, we have a first approximation of the equilibrium pressure relationships:

(1) $$P_p = P_{33} + P_s$$

where $P_p$ is the pump discharge fluid pressure at inlet 19 and at the right side of valve 12, $P_{33}$ is the pressure resulting from spring 33 urging valve 12 rightward, and $P_s$ is the steering reaction fluid pressure in conduit 29 and bore 27.

Assuming that the pressure at reservoir 33 is atmospheric and that:

$D_0$ is the pressure differential across the metering orifice 26, $D_1$ is the pressure differential across the upstream restriction between land 12d and wall portion 10a, and $D_2$ is the pressure differential across the downstream restriction between land 12c and wall portion 10a, we have:

(2) $$P_p = D_1 + D_2$$

and (3) $$D_0 = D_2 - P_s$$

Substituting $P_s$ from Equation 1 and $D_2$ from Equation 2 in Equation 3, we have:

(4) $$D_0 = P_{33} - D_1$$

Equation 4 states that the pressure differential across metering orifices 26 will equal the reaction pressure of spring 33 required to hold valve 12 in its equilibrium position, minus the pressure differential across the upstream restriction effected by land 12d. In order that pressurized fluid will flow through orifices 26 from chamber 25 into bore 27, so as to actuate steering gear 9, $D_1$ must be less than $P_{33}$. Also from Equation 4 as $D_1$ decreases upon rightward movement of valve 12, i.e., as $P_s$ increases, $D_0$ will increase to a maximum value equal to $P_{33}$, as desired for increased steering power. As $D_1$ increases upon leftward movement of valve 12, i.e., as the pump speed increases, $D_0$ will decrease as desired for increased vehicle speed.

Assuming now that pump 21 is not operating and that no fluid pressures exist within the circuit, spring 33 will urge valve 12 rightward to its closed position where at the right edge of land 12b will either abut or be adjacent the plug 13, depending upon the dimensions of spring 33. At this position the right or upstream edge of land 12c will be upstream of or to the right of edge 10c so as to block communication between bypass conduit 25 and outlet 20.

As pump 21 is operated with increasing speed, fluid is drawn into the inlet side of pump 21 from reservoir 33 via intake duct 21a and discharged via duct 22 into inlet 19 and thence through conduit 24 to the right end of valve 12. Also the fluid entering at 19 will pass through metering orifices 26 and thence via bore 27, conduit 28, the steering gear 9, and return conduit 30 to the reservoir 33 and inlet 21a of pump 21. Until the volume of fluid flow from pump 21 exceeds a predetermined value amounting to 2 or 3 gallons per minute for the usual power steering gear, spring 33 will hold valve 12 at its closed or rightward position and the total output of pump 21 will flow through the metering orifices 26. This condition prior to opening of valve 12 to bypass fluid between land 12c and edge 10c is indicated by the sharply inclined constant pressure curves at the left in FIGURE 2. At slow speed operation of the pump, leakage at high pressures will be significant, such that the flow rate through orifices 26 will be less when the pump pressure is increased, as for example by increasing the back pressure in bore 27, as indicated by the rightward displacement of the 400 and 750 p.s.i. curves.

When the speed of operation of pump 21 is increased to a value corresponding to engine speed at idle conditions, the output of pump 21 will preferably exceed the rate of flow desired for operation of the steering gear 9. Accordingly the fluid pressure at inlet 19 and at the right side of valve 12 will urge the latter leftward approximately to the position illustrated in solid lines so as to bypass the excess fluid through outlet 20 and conduit 23 to the reservoir 33 and the inlet side of pump 21.

Upon a continued increase in the speed of pump 21, corresponding to slow speed operation of the vehicle up to approximately 40 miles per hour for example, the pressure increase at the right end of valve 12 will urge the latter leftward to increase the opening at 10c and to move restricting land 12d leftward towards edge 10b. The pressure drop $D_0$ across metering orifices 26 will remain substantially constant according to Equation 4 through operational speeds of pump 21 corresponding to engine speeds ranging from idle up to approximately 40 miles per hour, because in this range, the restriction to fluid flow between land 12d and edge 10b will still be nominal. The rate of flow of fluid through orifices 26 will be substantially constant during this latter range of engine speed, as indicated by the generally horizontal portions of the constant pressure curves in FIGURE 2.

Upon a continued increase in pump speed corresponding to engine speeds between approximately 40 and 70 miles per hour, the increasing pressure at the right end of valve 12 will urge the latter still further leftward to effect an appreciable restriction between land 12d and edge 10b. In consequence, an appreciable pressure differential or gradient will exist between inlet 19 and the portion of conduit 25 downstream of land 12d. As a further consequence, the pressure differential $D_0$ across metering orifices 26 will be reduced and the volume of metered flow from conduit 25 into bore 27 and thence to the steering gear 9 will be reduced, as indicated by the rightwardly declining portions on the constant pressure curves in FIGURE 2. The pressure differential across land 12d will progressively increase upon leftward movement of valve 12 until land 12d moves leftward approximately to the dotted position illustrated, corresponding to an engine speed of approximately 70 m.p.h. Thereafter, further leftward movement of land 12d will not reduce the spacing between land 12d and wall portion 10a and will not increase the upstream restriction between inlet 19 and conduit 25, as indicated by the leveling of the constant pressure curves at the right in FIGURE 2.

Throughout the entire range of leftward or bypass movement of valve 12 corresponding to engine speeds from idling to the maximum engine operating speed, the downstream restriction between land 12c and edge 10c will progressively decrease, so as to bypass the excess capacity of pump 21, and the ratio $D_2:D_1$ of the pressure differentials will progressively decrease upon movement of the valve 12 in the leftward or bypass direction. This ratio will change slowly until valve 12 moves leftward approximately to the position illustrated by solid lines in FIGURE 1, then will be reduced rapidly as valve 12 moves from the solid line position to the dotted position, and thereafter will decrease more slowly as valve 12 moves leftward of the dotted position.

We thus have the condition that during comparatively slow engine speeds corresponding to vehicle speeds up to approximately 40 m.p.h., the restriction effected by land 12d will be negligible and the maximum pressure drop across metering orifices 26 will result. Accordingly the maximum flow of pressurized fluid to the steering gear 9 will be obtained during slow speed operation of the vehicle when the maximum steering effort is normally required, as for example during parking. As the engine speed increases to correspond to vehicle cruising conditions, as for example approximately 70 m.p.h., the land 12d will move approximately to the position indicated by the dotted lines to effect a maximum restriction upstream of the metering orifices 26, thereby to reduce the pressure drop across these orifices and to reduce the flow of pressurized fluid to the power steering gear 9.

During operation of the steering gear under load, the power demand of the steering gear will be reflected in an increased back pressure in conduit 29 and in bore 27 downstream of the orifices 26. This back pressure acting on the left side of valve 12 will tend to move the latter rightward, thereby to increase the downstream restriction between land 12c and edge 10c and to decrease the restriction between land 12d and edge 10b, except during very high speed pump operation when land 12d is located leftward of the dotted position shown in FIGURE 1. Accordingly when the steering gear is under load requiring increased power, the back pressure within bore 27 tends to increase the pressure drop across metering orifices 26, with the result that the volume of flow of pressurized fluid to the steering gear 9 is increased.

A secondary factor affecting the pressure differential $D_0$ with increasing pump output is the corresponding increasing rate of axial flow of fluid in passage 25 and the resulting decrease in static pressure at the high pressure sides of orifices 26, i.e., within passage 25. The decrease in static pressure will be determined by the cross sectional area of passage 25 and may be partially compensated for by the increased reaction force of spring 33 as valve 12 moves leftward.

Figure 3:
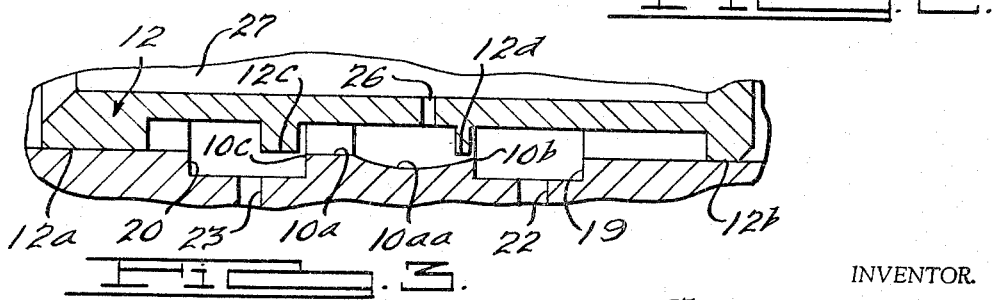
FIGURE 3 is a fragmentary view similar to FIGURE 1, showing a modification.

In the present instance, it is feasible to progressively decrease the downstream pressure gradient between the orifices 26 and the outlet 20 as valve 12 moves leftward throughout its complete range, while maintaining a nominal upstream pressure gradient between the orifices 26 and inlet 19 upon leftward shifting of valve 12 to approximately the solid line position of FIGURE 3, and then progressively increasing this upstream gradient upon continued leftward movement of valve 12.

Where it is desired to vary the relationships of the aforesaid pressure gradients in same other way than described, the slope of wall portion 10a may be suitably inclined conically leftward either toward or away from the axis of valve 12. FIGURE 3 shows a modification wherein the parts are the same in structure and operation as described above in regard to FIGURE 2, the only difference being that the upstream portion 10aa of wall portion 10a inclines away from the axis of valve 12. Thus after leftward movement of valve 12 positions land 12d downstream or leftward of edge 10b, continued leftward movement of land 12d corresponding to increasing speed and output of pump 21 will slightly open the upstream restriction between land 12d and wall 10aa. By suitably predetermining the slope of wall portion 10aa with respect to the dimension and location of land 12d, the pressure drop across the latter land can be maintained constant or decreased if desired as the pump output increases. Thereby to compensate for the tendency to decrease the static pressure at the high pressure sides of orifices 26 as the rate of fluid flow increases during high speed operation of the pump 21.

I claim:

1. Flow control valve means comprising relatively shiftable parts shiftable to and from a closed position and providing an inlet for pressurized fluid, an outlet, bypass conduit means connecting said inlet and outlet, a restricted metering orifice in communication with said bypass conduit means to receive metered fluid therefrom, means for appling fluid pressure from said inlet to said parts to urge relative shifting thereof in a bypass direction from said closed position, means for applying fluid pressure from the low pressure side of said metering orifice to said parts to oppose said relative shifting and urge said parts to said close position, reaction means also opposing said relative shifting to urge said parts to said closed position, and flow restricting means on said parts for adjustably restricting the connection between said conduit means and inlet and outlet respectively at locations upstream and downstream of said metering orifice upon said relative shifting, said flow restricting means including means for progessively increasing the restriction in the connection between said inlet and conduit means to a predetermined maximum partial restriction capable of passing a comparatively high rate of by-pass flow into said conduit means from said inlet upon said relative shifting progessively from said closed position only to an intermediate bypass position within the operating limits of said valve means and for thereafter maintaining said partial restriction at not greater than said maximum restriction upon said continued relative shifting of said parts from said closed position beyond said intermediate bypass position to the operating limit of said valve means.

2. A flow control valve according to claim 1, said flow restricting means including means for maintaining the ratio of the fluid pressure drop across the downstream connection between said conduit means and outlet with respect to the fluid pressure drop across the upstream connection between said conduit means and inlet at substantially a maximum upon said relative shifting of said parts throughout a first predetermined range of positions from said closed position in said bypass direction, for progressively reducing said ratio rapidly upon continued relative shifting of said parts in said bypass direction throughout a second predetermined range of positions, and for progressively reducing said ratio at a less rapid rate upon still continued relative shifting of said parts in said bypass direction.

3. Flow control valve means comprising relatively shiftable parts shiftable to and from a closed position and providing an inlet for pressurized fluid, an outlet, bypass conduit means connecting said inlet and outlet, a restricted metering orifice in communication with said bypass conduit means to receive metered fluid therefrom, means for applying fluid pressure from said inlet to said parts to urge relative shifting thereof in a bypass direction from said closed position, means for applying fluid pressure from the low pressure side of said metering orifice to said parts to oppose said relative shifting and urge said parts to said closed position, reaction means also opposing said relative shifting to urge said parts to said closed position, means on said parts for restricting the connection between said bypass conduit means and outlet downstream of said metering orifice when said parts are at said closed position and for progressively decreasing the restriction in said connection upon relative shifting of said parts in said bypass direction from said closed position, and means on said parts for progressively restricting the connection between said inlet and conduit means to a predetermined maximum partial restriction capable of passing a comparatively high rate of bypass flow into said conduit means from said inlet upon said relative shifting in said bypass direction only to an intermediate bypass position within the operating limits of said valve means and for thereafter maintaining said partial restriction at not greater than said maximum restriction upon said continued relative shifting in said bypass direction beyond said intermediate bypass position to the operating limit of said valve means.

4. Flow control valve means comprising relatively shiftable parts shiftable to and from a closed position and providing an inlet for pressurized fluid, an outlet, bypass conduit means connecting said inlet and outlet, a restricted metering orifice in communication with said bypass conduit means to receive metered fluid therefrom, means for applying fluid pressure from said inlet to said parts to urge relative shifting thereof in a bypass direction from said closed position, means for applying fluid pressure from the low pressure side of said metering orifice to said parts to oppose said relative shifting and urge said parts to said closed position, reaction means also opposing said relative shifting to urge said parts to said closed position, means on said parts for restricting the connection between said conduit means and outlet downstream of said orifice and for connecting said orifice with said inlet when said parts are at said closed position, for progressively decreasing the restriction in the connection between said conduit means and oulet downstream of said orifice and for progressively restricting the connection between said conduit means and inlet upstream of said orifice upon relative shifting of said parts throughout a first predetermined distance in said bypass direction, and for progressively decreasing said restriction downstream of said orifice while maintaining said restriction upstream of said orifice substantially unchanged upon continued relative shifting of said parts in said bypass direction throughout a second predetermined distance.

5. Flow control valve means comprising relatively shiftable parts shiftable to and from a closed position and providing an inlet for pressurized fluid, an outlet, bypass conduit means connecting said inlet and outlet, a restricted metering orifice in communication with said bypass conduit means to receive metered fluid therefrom, means for applying fluid pressure from said inlet to said parts to urge relative shifting thereof in a bypass direction from said closed position, means for applying fluid pressure from the low pressure side of said metering orifice to said parts to oppose said relative shifting and urge said parts to said closed position, reaction means also opposing said relative shifting to urge said parts to said closed position, means on said parts for adjusting the upstream pressure gradient in said conduit means between said inlet and orifice and the downstream pressure gradient between said orifice and outlet upon said relative shifting so as to progressively decrease said downstream gradient upon said shifting of said parts through a predetermined range in said bypass direction from said closed position, to maintain a nominal upstream pressure gradient upon said shifting of said parts in said direction throughout a first portion of said range, and to progressively increase said upstream pressure gradient upon continued shifting of said parts in said direction throughout the remainder of said range.

6. Flow control valve means comprising relatively shiftable parts shiftable to and from a closed position and providing an inlet for pressurized fluid, an outlet, bypass conduit means connecting said inlet and outlet, a restricted metering orifice in communication with said bypass conduit means to receive metered fluid therefrom, means for applying fluid pressure from said inlet to said parts to urge relative shifting thereof in a bypass direction from said closed position, means for applying fluid pressure from the low pressure side of said metering orifice to said parts to oppose said relative shifting and urge said parts to said closed position, reaction means also opposing said relative shifting to urge said parts to said closed position, means on said parts for providing a maximum downstream restriction in the connection between said conduit means and outlet downstream of said orifice when said parts are at said closed positions, for progressively decreasing said downstream restriction upon shifting of said parts in said bypass direction from said closed position, for providing a minimum upstream restriction in the connection between said conduit means and inlet upstream of said orifice when said parts are at said closed position, for progressively increasing said upstream restriction upon shifting of said parts throughout a predetermined range in said bypass direction from said closed position, and for maintaining said upstream restriction substantially constant upon continued shifting of said parts in said bypass direction.

7. In a power steering circuit for an automotive vehicle, a fluid pressure actuated steering gear, a pump for supplying pressurized fluid, flow control valve means comprising relatively shiftable parts shiftable to and from a closed position and providing an inlet in communication with the discharge side of said pump to receive said pressurized fluid therefrom, an outlet in communication with the intake side of said pump to supply bypass fluid thereto, bypass conduit means connecting said inlet and outlet, a restricted metering orifice having a high pressure side in communication with said bypass conduit means to receive pressurized metered fluid therefrom and having a low pressure side in communication with said steering gear to discharge said metered fluid thereto, means for applying the pressure at said inlet to said parts to urge relative shifting thereof in a bypass direction from said closed position, reaction means for opposing said relative shifting and urging said parts to said closed position, means for applying the pressure at the low pressure side of said metering orifice to said parts assist said reaction means in opposing said relative shifting and urging said parts to said closed position, and means on said parts for adjustably restricting the connection between said inlet and outlet via said conduit means to increase the fluid flow through said conduit means upon said relative shifting in said bypass direction from said closed position, including means for effecting substantially maximum static pressure in said conduit means at the region of the high pressure side of said orifice upon said relative shifting of said parts throughout a first range of positions in said bypass direction from said closed position, for decreasing said static pressure to a predetermined value upon continued relative shifting of said parts in said direction throughout a second range of positions, and for maintaining said static pressure at a value approximately on the order of said predetermined value upon continued relative shifting of said parts in said direction.

8. In a flow control valve for an automotive vehicle power steering gear, a first valve part having an inlet adapted to be connected with a source of pressurized fluid, an outlet in said first part and spaced in a downstream direction from said inlet, a second valve part relatively shiftable with respect to said first valve part in said direction from a closed position, said parts providing a bypass conduit for connecting said inlet and outlet and also providing a restricted metering orifice in communication with said bypass conduit to receive metered fluid therefrom, conduit means connecting said inlet with said parts to apply fluid pressure thereto to urge relative shifting of said parts in said direction from said closed position, second conduit means connecting the low pressure side of said metering orifice with said parts to apply fluid pressure thereto to oppose said relative shifting, reaction means supplemental to the fluid pressure in said second conduit means to oppose said relative shifting, a downstream land on said second part effecting a downstream restriction in the connection between said bypass conduit and outlet downstream of the connection between said metering orifice and bypass conduit and relatively shiftable with said second part in said direction from said closed position to progressively decreases said downstream restriction, an upstream land on said second part for effecting an upstream restriction between said inlet and bypass conduit upstream of the connection between said metering orifice and bypass conduit and relatively shiftable with said second part in said direction from said closed position to an intermediate position to increase said upstream restriction, said second valve part being relatively shiftable within the operating limits of said valve and in said direction beyond said intermediate position, said upstream land and first valve part being dimensioned to provide a bypass clearance therebetween into said bypass conduit from said inlet and having a restriction not greater than said upstream restriction when said parts are at said intermediate position, upon the relative shifting of said second valve part in said direction beyond said intermediate position.

9. In a flow control valve according to claim 8, one wall of said bypass conduit comprising a portion of said first valve part extending from said inlet to said outlet, said upstream land being cooperable with said portion to maintain said upstream restriction at substantially its minimum value upon said relative shifting of said parts in said direction throughout a first range of positions from said closed position, to rapidly increase said restriction upon continued relative shifting of said parts in said direction throughout a second range of positions, and to maintain said restriction substantially constant upon still continued relative shifting of said parts in said direction.

10. In a flow control valve according to claim 8, one wall of said bypass conduit comprising a portion of said first valve part extending in the direction of said relative shifting from an upstream edge at said inlet to a downstream edge at said outlet, said upstream land being upstream of said upstream edge when said parts are at said closed position and being relatively shiftable with said second part in said direction to a position downstream of said upstream edge within the operating range of said valve.

11. In the combination according to claim 10, said metering orifice being in said second valve part at a location between said lands.

References Cited by the Examiner
UNITED STATES PATENTS 3,146,719   9/1964   Drutchas _____ 137—117

WILLIAM F. O'DEA, Primary Examiner.

H. COHN, Assistant Examiner.